US012202011B2

(12) United States Patent
Thakur et al.

(10) Patent No.: US 12,202,011 B2
(45) Date of Patent: Jan. 21, 2025

(54) CONTINUOUS RAPID METAL SORTING VIA MACHINE-READABLE MARKING

(71) Applicant: Novelis Inc., Atlanta, GA (US)

(72) Inventors: Adwait Thakur, Spokane Valley, WA (US); Tina Kosmicki, Spokane, WA (US); John Robert Buster McCallum, Spokane, WA (US)

(73) Assignee: NOVELIS INC., Atlanta, GA (US)

(*) Notice: Subject to any disclaimer, the term of this patent is extended or adjusted under 35 U.S.C. 154(b) by 0 days.

(21) Appl. No.: 18/556,144

(22) PCT Filed: Jun. 6, 2022

(86) PCT No.: PCT/US2022/072770
§ 371 (c)(1),
(2) Date: Oct. 19, 2023

(87) PCT Pub. No.: WO2022/261615
PCT Pub. Date: Dec. 15, 2022

(65) Prior Publication Data

US 2024/0189863 A1 Jun. 13, 2024

Related U.S. Application Data

(60) Provisional application No. 63/202,408, filed on Jun. 10, 2021.

(51) Int. Cl.

| | |
|---|---|
| ***B07C 5/34*** | (2006.01) |
| ***B07C 5/342*** | (2006.01) |
| ***B07C 5/36*** | (2006.01) |

(52) U.S. Cl.
CPC .......... *B07C 5/3412* (2013.01); *B07C 5/3416* (2013.01); *B07C 5/342* (2013.01); *B07C 5/363* (2013.01)

(58) Field of Classification Search
CPC ....... B07B 5/342; B07B 5/363; B07B 5/3412; B07B 5/3416
(Continued)

(56) References Cited

U.S. PATENT DOCUMENTS

2001/0045378 A1* 11/2001 Charles .................. C22B 7/005 209/3.3

FOREIGN PATENT DOCUMENTS

CA 3132866 A1 * 9/2020 ............ B07C 5/342
CN 106583270 A * 4/2017
(Continued)

OTHER PUBLICATIONS

PCT/US2022/072770 , "International Search Repon and Written Opinion", Nov. 25, 2022, 21 pages.
(Continued)

*Primary Examiner* — Terrell H Matthews
(74) *Attorney, Agent, or Firm* — Kilpatrick Townsend & Stockton LLP

(57) ABSTRACT

Methods and systems for sorting mixed metal scrap may first determine a sorting attribute of each article of metal scrap, and subsequently mark each article with a machine-readable or visually identifiable mark according to the sorting attribute. The articles of mixed metal scrap can be sorted along a high throughput conveyance using a series of sensors to scan the articles for the machine-readable marks, and rapidly sorting marked articles to appropriate sorting destinations based on detecting the machine-readable marks, and without requiring repeat identification by metal analyzers at the sorting step.

20 Claims, 9 Drawing Sheets

(58) Field of Classification Search
USPC ........................................................ 209/3.3
See application file for complete search history.

(56) References Cited

FOREIGN PATENT DOCUMENTS

| | | | | | |
|---|---|---|---|---|---|
| CN | 108554821 | A | * | 9/2018 | ............. B07B 13/05 |
| DE | 102012003519 | A1 | * | 8/2013 | ......... G01N 21/6447 |
| KR | 101844442 | B1 | * | 4/2018 | |
| WO | WO-2017011835 | A1 | * | 1/2017 | ............... B07C 5/10 |
| WO | WO-2022261615 | A1 | * | 12/2022 | ........... B07C 5/3412 |

OTHER PUBLICATIONS

PCT/US2022/072770 , "Invitation to Pay Additional Fees and, Where Applicable, Protest Fee", Oct. 4, 2022, 7 pages.

PCT/US2022/072770, "International Preliminary Report on Patentability", Dec. 21, 2023, 16 pages.

PCT/US2022/072770, "International Search Report and Written Opinion", Nov. 25, 2022, 21 pages.

* cited by examiner

CONTINUOUS RAPID METAL SORTING VIA MACHINE-READABLE MARKING

CROSS-REFERENCE TO RELATED APPLICATION

This application claims the benefit of and priority to U.S. Provisional Application No. 63/202,408, filed on Jun. 10, 2021, and entitled CONTINUOUS RAPID METAL SORTING VIA MACHINE-READABLE MARKING, the content of which is hereby incorporated by reference in its entirety for all purposes.

FIELD

The present disclosure generally relates to methods and systems for efficiently sorting recyclable materials, particularly metal scrap.

BACKGROUND

A bottleneck in all forms of recycling is the positive identification and sorting of recyclable materials that have different properties, or that require different recycling processes. The sorting step is particularly challenging in the context of mixed metal recycling, where metal parts appear similar to each other and yet be composed of different metals or metal alloys that must be separated before they can be recycled. Existing processes for sorting mixed metal scrap include scanning metal scrap, piece by piece, using an analyzer to identify the metal, and then to make a binary sorting decision immediately after analysis to direct the metal to a sorting destination if it meets specific criteria. Often, this process involves many steps of analysis and re-identification before the recyclable material has been sorted to the appropriate destination, leading to a nontrivial bottleneck in the recycling process.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

In one aspect, the present disclosure describes systems and methods for sorting metal scrap, whereby metal scrap is conveyed to a metal analyzer to determine a sorting attribute of the metal scrap. Suitable sorting attributes can include, e.g., the type of metal, type of alloy, or alloy series. Each article of metal scrap is subsequently marked according to the sorting attribute with a machine-readable or visually identifiable marking, and then conveyed to a rapid conveyance for sorting. Along the rapid conveyance, articles of mixed metal scrap are sorted, without requiring repeated identification, using sensors positioned along the rapid conveyance to detect the machine-readable marks deposited by the marking device. These sensors also determine whether each article of metal scrap meets a sorting criterion for directing the articles to a series of sorting destinations. According to some aspects, the rapid conveyance will pass the articles of metal scraps past multiple locations at which the articles can be scanned for markings that designate the articles for sorting, and can be removed from the rapid conveyance by an actuator positioned at the appropriate location to divert the article to the sorting destination that matches the sorting criterion of the article. The disclosed methods and systems provide for rapidly sorting marked articles to appropriate sorting destinations based on detecting the machine-readable marks, and without requiring repeat identification by metal analyzers at the sorting step.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
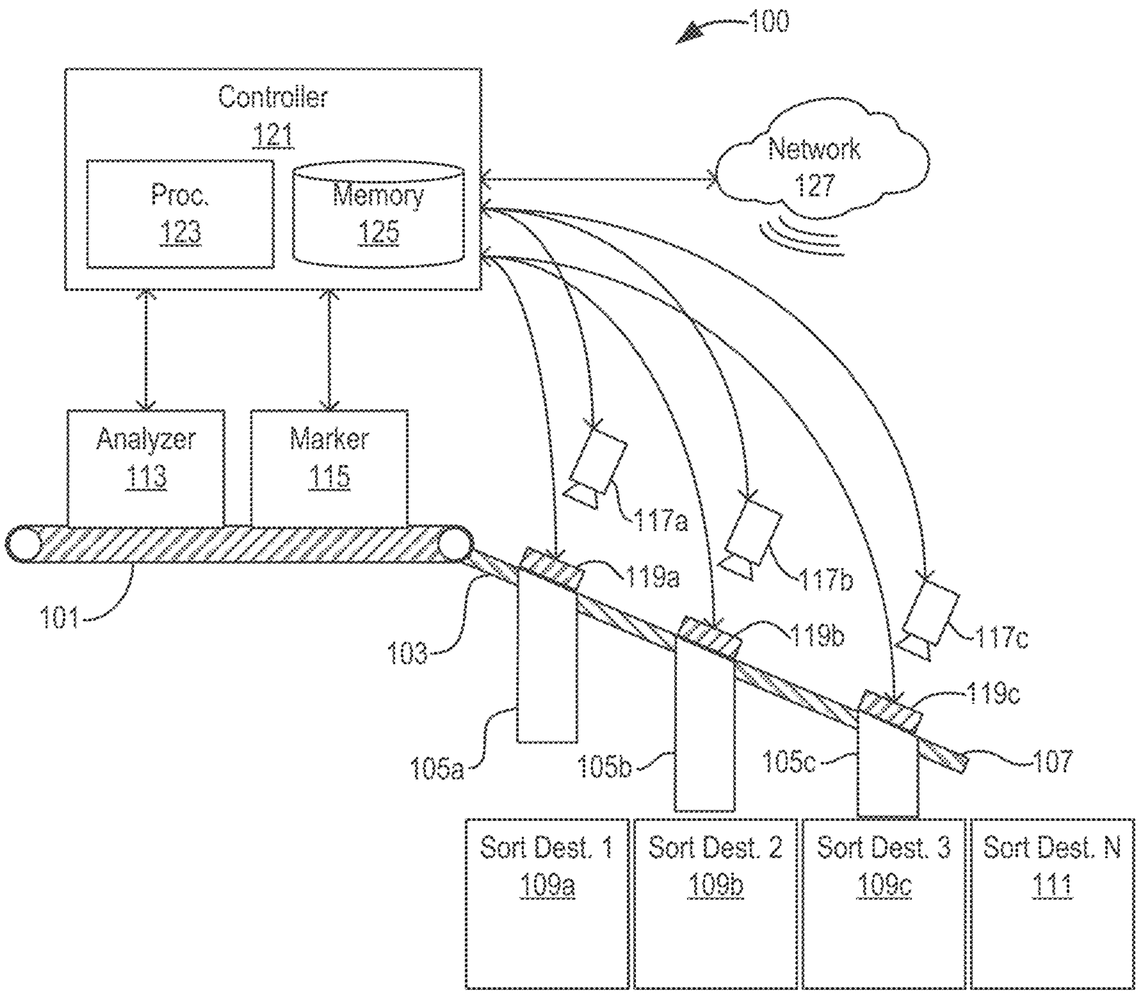
FIG. 1 is a high-level side view schematic illustrating a system for sorting recyclable metal scraps, in accordance with various embodiments.

Described herein are methods and systems for sorting recyclable materials. The disclosed methods and systems may be particularly useful for sorting articles of mixed metal scrap or mixed scrap aluminum. The methods and systems involve a continuous sorting process that includes determining a sorting attribute of each article (e.g. a particular alloy or other characteristic of metal scrap) and then marking each article of metal scrap with a visually identifiable and/or machine-readable mark that can be used to quickly identify the sorting attribute. In a second stage of the sorting methods and systems, the articles of mixed metal scrap can be rapidly conveyed past a series of sensors and actuators, where each actuator is staged at a location where the articles can be removed from the conveyance via the actuators for sorting to a series of sorting destinations with other articles of the metal scrap having the same sorting attribute. The actuators can be triggered by an automated sorting system when sensors staged at each location along the conveyance detect that an article of metal scrap is marked according to the particular sorting attribute.

The methods and systems described herein provide a more efficient means of sorting metal scrap, particularly for recycling, according to attributes that are identifiable via metal analysis but not readily identifiable by other properties like size or density. In existing sorting systems, e.g. for identifying and sorting different types of aluminum alloy, a sorting system must analyze an article of aluminum scrap and then immediately determine whether to sort the article according to the results of the analysis. These sorting systems involve repeating a binary determination of whether the article has a particular composition at each subsequent analyzing and sorting station. In practice, such sorting systems are rate limited because an additional identification step must be performed for each aluminum alloy that the system can process, requiring a series of analyzers and requiring that the sorting process take place at a speed limited by the throughput of the analyzers. In contrast, methods and systems described herein allow for a single identification step that can be performed along a slow-moving conveyor that is followed by a marking step, and the throughput of the identification step can be increased by providing multiple analyzers in parallel or by performing the identification and marking steps on multiple conveyors. The sorting step can thus be decoupled from identification, and can be performed using a more high-throughput conveyance such as a high-speed conveyor, a gravity fed shoot, or other suitable conveyance. Identifying the sorting attribute associated with each article of metal scrap can be performed along the high-throughput conveyance using the marking without requiring additional analysis, and automated sorting accordingly can be conducted at much higher speeds. Various other benefits and advantages may be realized with the systems and methods provided herein, and the aforementioned advantages should not be considered limiting.

FIG. 1 is a high-level side view schematic illustrating a system 100 for sorting recyclable metal scraps, in accordance with various embodiments. The system 100 includes a conveyor 101 for carrying articles of mixed metal scrap for analysis by a metal analyzer 113 and subsequent marking by a marking device 115 with a sorting attribute. The conveyor 101 subsequently deposits the articles of the marked mixed metal scrap on a high-throughput conveyance 103 from which the articles of metal scrap are sorted. The high-throughput conveyance 103 can include any suitable chute or conveyer that accommodates rapid movement of the articles of metal scrap, such as but not limited to: a sloped chute, rapid conveyor, sloped assembly of rollers, or other suitable high-throughput conveyance. According to some embodiments, the rapid conveyance 103 can be treated to increase the speed at which articles of metal scrap can be processed, e.g., with low-friction surface coatings, oil, or the like.

The sorting process conducted from the high-throughput conveyance 103 includes passing the articles of mixed metal scrap in a continuous process past a series of sensors 117 (such as sensors 117*a*, 117*b*, 117*c*, any suitable number of sensors in series may be included)), each sensor being associated with an actuator 119 (such as actuators 119*a*, 119*b*, 119*c*, although more or fewer actuators may be used). The actuators 119 are positioned along the high-throughput conveyance 103 to displace articles of mixed metal scrap for sorting to one of any suitable number of sorting destinations 109 (such as sorting destinations 109*a*, 109*b*, 109*c*, etc.), where each sorting destination 109 is designated for receiving metal scrap having a particular sorting attribute. The high-throughput conveyance 103 can be positioned directly above the sorting destinations 109 to facilitate immediately depositing sorted metal scrap to the appropriate sorting destinations 109, and/or the high-throughput conveyance 103 can be connected with a series of paths, conveyors, or chutes (such as, e.g., chutes 105*a*, 105*b*, 105*c*) for directing the sorted articles to the sorting destinations 109*a*, 109*b*, 109*c*, respectively. The system 100 can include a final sorting destination 111 for receiving mixed metal scrap that does not meet any of the supported sorting criteria, or that otherwise escapes detection by the system 100, and that proceeds to a final outlet path 107 of the high-throughput conveyance 103.

The functions of the analyzer 113, marking device 115, sensors 117, and actuators 119 can be automated under the control of a controller 121 that includes at least one processor 123 and operates by executable instructions stored in a non-transitory, non-volatile memory device 125. According to various embodiments, the controller 121 can be a single computer system that is connected to the electromechanical components of the system 100, directly or indirectly, e.g. via a network 127 such as a wireless network. According to various other embodiments, the controller 121 can be made up of any suitable number of local and remote computing systems that cooperate to control the analyzer 113, marking device 115, sensors 117, and actuators 119, all of which may be connected to each other directly or indirectly via network 127.

The analyzer 113 can include any suitable metal analyzer capable of detecting a metal type or determining the composition of an article of metal scrap or otherwise identifying a sorting attribute of the metal scrap. According to some embodiments, a sorting attribute of the metal scrap can be the specific metal alloy or the series of metal article. For example, according to some specific embodiments, the analyzer 113 can be a metal analyzer for determining the class of aluminum alloy of the metal scrap, e.g. the specific alloy or the alloy series, e.g., 1xxx series aluminum alloy, 2xxx series aluminum alloy, 3xxx series aluminum alloy, 4xxx series aluminum alloy, 5xxx series aluminum alloy, 6xxx series aluminum alloy, 7xxx series aluminum alloy, or 8xxx series aluminum alloy. Suitable analyzers can include, but are not limited to, a laser-induced breakdown spectroscope (LIBS) metal analyzer, an X-ray fluorescence (XRF) metal analyzer, an X-ray trace (XRT) metal analyzer, or a prompt gamma neutron activation analyzer (PGNAA). According to some embodiments, the analyzer 113 can determine the sorting attribute of an article of metal scrap in times on the order of milliseconds, and at ranges of up to about 300 mm from the article. Increasing the throughput of the sorting system 100 can be achieved by including multiple analyzers 113 along the conveyor 101 that can analyze different articles as they pass along the conveyor 101. According to at least one embodiment, the analyzer 113 can include at least two LIBS or other metal analyzers in parallel, although any number of analyzers 113 can be included.

After each metal article is analyzed by the analyzer 113, the conveyor 101 can convey the article to the marking device 115, which places a visually identifiable and/or machine-readable marking on the article according to the sorting attribute of the article that has been identified by the analyzer 113. According to various embodiments, the marking device 115 can include a paint sprayer configured to direct aerosolized paint to a point or region on the article of metal scrap, a pellet gun configured to direct a capsule of paint to a point or region of the article of metal scrap, a laser configured to etch a pattern or marking on the article of metal scrap, a robotic device configured to stamp the article with an ink or paint pattern, with a physical tag, with an RFID tag, or with any other suitable machine-readable or visually identifiable marking, or any other suitable marking device to mark the article of metal scrap with a machine-readable or visually identifiable marking.

According to some embodiments, the marking device 115 can be configured to impart a pattern of paint on the article including two or more colors. Depending on the number of sorting attributes for which the system 100 is designed, the marking device 115 can color code articles with a different color to denote each sorting attribute, or can color code articles with a pattern of two or more different colors to denote the sorting attributes. According to some embodiments, the marking device 115 can code the articles with colors in the visible spectrum that can be identified by either human operators or by optical sensors. Alternatively, or in combination, the marking device 115 can code the articles with ultraviolet paint or with fluorescent paint that can be detected by suitable optical sensors. The use of color coding outside of the visible spectrum or with fluorescence can be used to avoid interference by any existing paint or discoloration on the articles of metal scrap.

According to at least one embodiment, the analyzer 113 and the marking device 115 can be included in the same device, e.g., some metal analyzers being capable of both analyzing and laser etching the articles of metal scrap. For example, a LIBS analyzer can perform both the analysis and marking function by determining the sorting attribute of an article of metal scrap and then subsequently etching a pattern of marks on the metal article using a laser.

The sensors 117 can include any suitable automated sensor that can quickly read the type of marking placed on the articles of metal scrap by the marking device 115. According to various embodiments, where the marking device 115 paints a color or a pattern on the articles of metal scrap, the sensors 117 include a series of cameras that obtain images of the articles of metal scrap as they pass along the high-throughput conveyance 103. The amount of paint required for positive identification can be very small, e.g., having a diameter in the range of 3 mm to 30 mm. The captured images are quickly processed by the controller 121 to determine, at each location along the high-throughput conveyance 103, whether an article includes a marking that identifies the article as having the sorting attribute for a particular sorting destination 109. Cameras can be used as the sensors 117 when the marking device 115 etches a pattern of marks on each article of metal scrap, or for any case where the marking is visually identifiable. In some alternative embodiments, where the marking is a machine-readable code or an RFID tag, the sensors 117 can include a code reader or an RFID sensor.

The actuators 119 can include any suitable electromechanically actuated mechanism, including pneumatic mechanisms, that can rapidly displace the articles of metal scrap as they pass along the high-throughput conveyance 103. For example, according to some embodiments, the actuators 119 are pneumatic actuators configured to push the articles of metal scrap off to one side of the high-throughput conveyance 103, to drop articles from the high-throughput conveyance 103, or to divert the articles from the high-throughput conveyance 103 to any one of a series of alternate paths or chutes 105 that may diverge from the high-throughput conveyance 103. The actuators 119 are preferably configured to displace the articles of metal scrap rapidly and to return to a starting position quickly enough that displacing any one article does not interfere with passage of any subsequent articles along the high-throughput conveyance 103. According to some embodiments, the time to cycle the actuators 119 can be on the order of 10 ms to 1000 ms, or from 100 ms to 1000 ms.

Although systems and methods described herein refer to single instances of the analyzer 113, marker 115, and each stage of sensors 117*a-c* and actuators 119*a-c*, note that the systems and methods can accommodate parallel and simultaneous analyzing, marking, sensing and sorting. For example, analyzer 113 can include multiple and potentially many analyzers working in parallel across the first conveyance 101 to process a flow of many articles of metal scrap simultaneously and in parallel. Likewise, marker 115 can include multiple, potentially many individual markers associated with the analyzer 113 for marking analyzed articles of metal scrap in a simultaneous and parallel process. The number of individual analyzers and markers is not necessarily equal, depending on the processing capacity of each. Similarly, each stage of sensors 117*a-c* can include multiple, potentially many individual sensors that operate in parallel to cover an area of the high-throughput conveyance 103, and each stage of actuators 119*a-c* can include several, potentially many individual actuators to selectively divert individual articles of metal scrap so that multiple articles of metal scrap can pass along the high-throughput conveyance at the same time. Alternatively, or in combination with the above, multiple high-throughput conveyances 103 can originate from each first conveyance 101 in order to spread the physical sorting space and speed the sorting process in systems where the physical sorting stage would otherwise be a process bottleneck. Conversely, multiple first conveyances 101 could feed a single high-throughput conveyance 103 in systems where the analysis/marking stage would otherwise be a process bottleneck. Similar variations in simultaneous and parallel system componentry can apply equally to the following systems and methods disclosed below.

Figure 2:
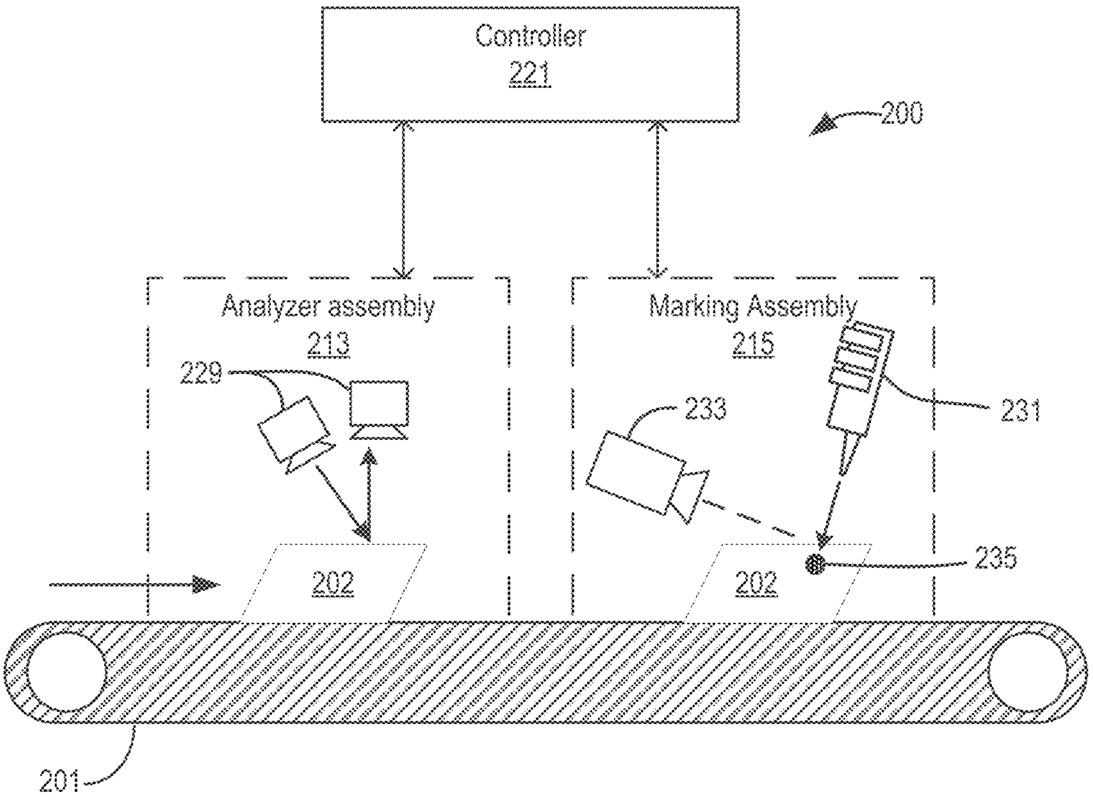
FIG. 2 is a side-view schematic illustrating aspects compatible with the system of FIG. 1, including a metal analysis and marking process.

FIG. 2 is a side-view schematic illustrating aspects compatible with the system of FIG. 1, including a metal analysis and marking system 200, in accordance with various embodiments. The analysis and marking system 200 includes a conveyor 201 configured to convey an article of metal scrap 202 through an analyzer assembly 213 and subsequently through a marking assembly 215. (Note that like numeration indicates like components as between FIGS. 1 through 4.) The analyzer assembly 213 can include any suitable number and type of metal analyzers, e.g., analyzer 229. The analyzer 229 obtains compositional information about the article of metal scrap 202 by, e.g., any suitable spectroscopic or other rapid analytical technique. For example, where the analyzer 229 is a LIBS metal analyzer, the analytical steps include irradiating a point on the surface of the article of metal scrap 202 with a laser and obtaining spectroscopic information from the irradiated point by a detector. Suitable analyzers can include, but are not limited to, laser-induced breakdown spectroscopy (LIBS), X-ray fluorescence (XRF), X-ray trace (XRT), and prompt gamma neutron activation (PGNA).

The compositional or other identifying information obtained by the analyzer 229 is interpreted by the controller 221 to determine the sorting attribute associated with the article of metal scrap 202. The controller 221 can then instruct the marking assembly 215 to impart the appropriate mark on the article of metal scrap 202 based on the determined sorting attribute. According to some embodiments, the marking assembly 215 can include a sensor 233 that detects when the article of metal scrap 202 is in position for marking, and a marking device 231 for imparting the mark 235 on the article of metal scrap 202. The marking device 231 can include any suitable paint deposition device, e.g., for ejecting a pressurized aerosol, a paint capsule, or a cartridge system for ejecting paint droplets at high speed. According to various alternatives, the marking device can include a laser or can include a robotic device for imparting a physical tag or RFID tag.

Figure 3:
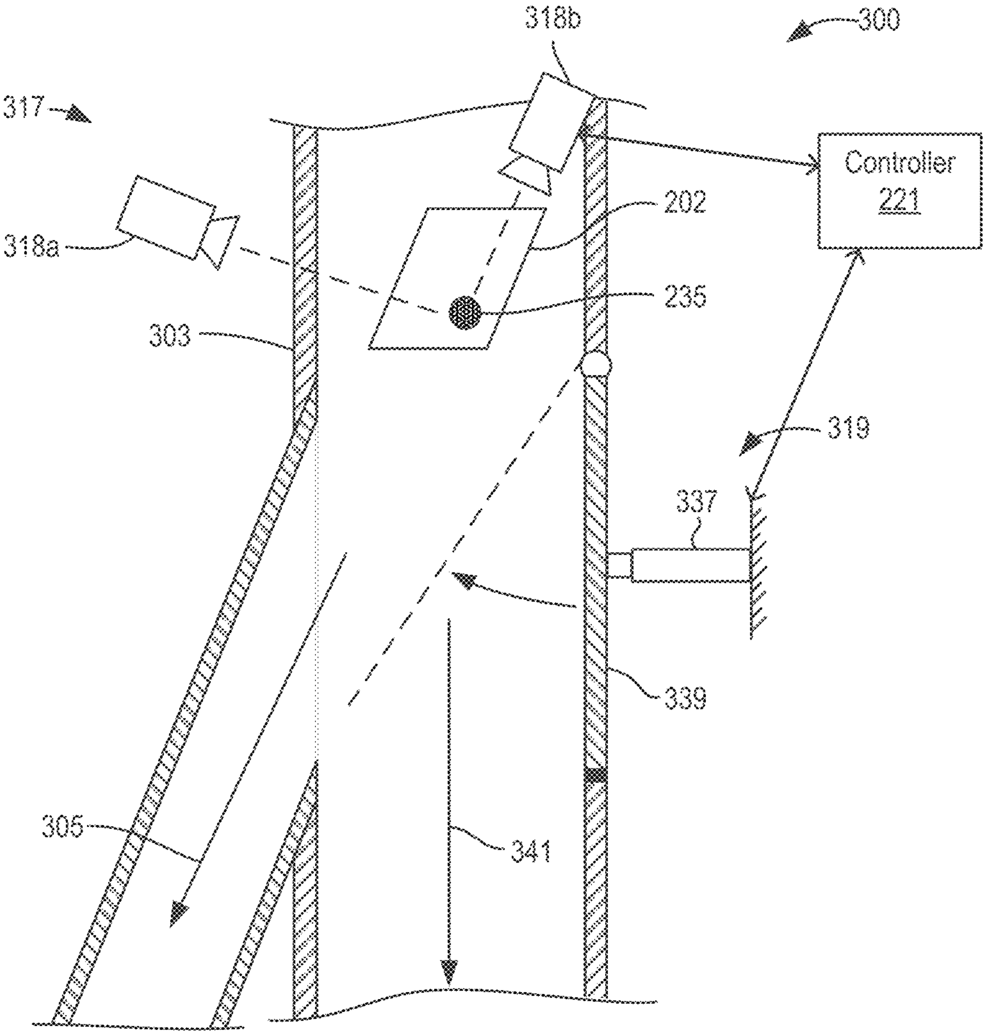
FIG. 3 is a top-view schematic illustrating a first example of aspects of a metal sorting process compatible with the system of FIG. 1.

FIG. 3 is a top-view schematic illustrating aspects compatible with the system of FIG. 1, including a mixed metal sorting system 300. The mixed metal sorting system 300 includes a high-throughput conveyance 303, such as but not limited to, a sloped chute, rapid conveyor, set of rollers, or other suitable high-throughput conveyance. As a marked article of metal scrap 202 passes along the high-throughput conveyance 303, the marked article of metal scrap 202 will pass by a series of sensing stations 317, which can include any suitable number of sensors 318 (such as sensors 318*a*, 318*b*, etc.). The sensors 318 can include any suitable sensor for detecting the type of marking 235 that has been placed on the marked article 202. According to some embodiments, the sensors 318 are cameras, which can be positioned to view multiple angles of the marked article 202 to reduce the likelihood that the system 300 will miss the marking 235. In conjunction with controller 221, the sensors 318 can detect the marking 235 and determine whether the marked article 202 qualifies for sorting to an outlet path 305 to a particular sorting destination, or whether the marked article 202 does not qualify, in which case the marked article can continue along a main path 341 of the high-throughput conveyance 303. According to various embodiments, not all articles that pass the analyzer assembly 213 (FIG. 2) need to be marked. For example, small pieces (below a threshold size), organics, or metals other than those targeted for sorting can be omitted from marking and allowed to pass to the end of the sorting system 300. In some embodiments, the outlet path 305 can simply be ejection from a side of the high-throughput conveyance 303. Alternatively, the outlet path 305 can include a different chute or rapid conveyor.

If the mixed metal sorting system 300 determines that the marked article 202 does qualify for sorting based on the marking 235, the controller 221 instructs an actuator 319 to push the marked article off of the high-throughput conveyance 303 along the outlet path 305. Any suitable electromechanical or pneumatic actuator may be used. According to at least one embodiment, the actuator 319 includes a pneumatic actuator 337 connected with a panel 339 that, when actuated by the pneumatic actuator 337, pushes the marked article 202 or otherwise obstructs the path of the marked article to force the marked article along the outlet path 305.

Figure 4:
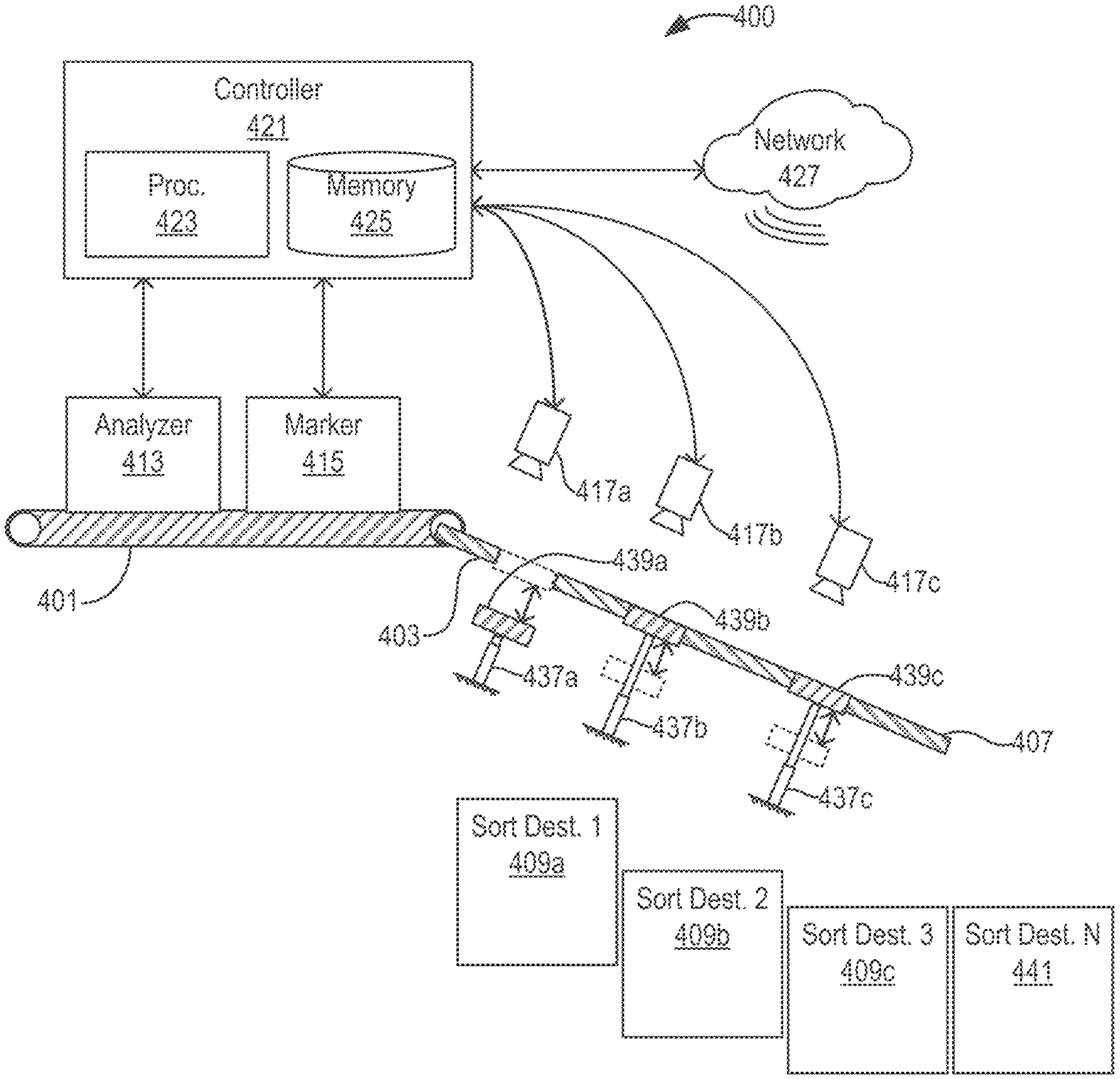
FIG. 4 is a side-view schematic illustrating a second example of a system for sorting recyclable metal scraps, in accordance with various embodiments

FIG. 4 is a high-level side view schematic illustrating a second system 400 for sorting recyclable metal scraps, in accordance with various embodiments. The system 400 includes a conveyor 401 for carrying articles of mixed metal scrap for analysis by a metal analyzer 413 and subsequent marking by a marking device 415 with a sorting attribute, which function in a similar manner to analyzer 113 and marking device 115 shown in FIG. 1. The conveyor 401 subsequently deposits the articles of the marked mixed metal scrap on a high-throughput conveyance 403 from which the articles of metal scrap are sorted. The high-throughput conveyance 403 can include any suitable chute or conveyer that accommodates rapid movement of the articles of metal scrap, such as but not limited to: a sloped chute, rapid conveyor, sloped assembly of rollers, or other suitable high-throughput conveyance. According to some embodiments, the rapid conveyance 403 can be treated to increase the speed at which articles of metal scrap can be processed, e.g., with low-friction surface coatings, oil, or the like.

The sorting process conducted from the high-throughput conveyance 403 includes passing the articles of mixed metal scrap in a continuous process past a series of sensors 417 (such as sensors 417*a*, 417*b*, 417*c*, any suitable number of sensors in series may be included)), each sensor being associated with an actuatable panel (such as panels 439*a*, 439*b*, 439*c*, although more or fewer panels may be used, including panels positioned in parallel with each other along the conveyance 403). The panels 439 are positioned along the high-throughput conveyance 403 to displace articles of mixed metal scrap for sorting to one of any suitable number of sorting destinations 409 (such as sorting destinations 409*a*, 409*b*, 409*c*, etc.), by dropping the articles of mixed metal scrap underneath the conveyance when actuated by actuators 437*a*, 437*b*, 437*c*. Each sorting destination 409 is designated for receiving metal scrap having a particular sorting attribute, and any suitable number of sorting destinations can be used, as well as any suitalbe number of panels 439 and corresponding actuators 327. The number of panels 439 and actuators 437 can match the number of sorting destinations 409, or can exceed the number of sorting destinations if multiple panels are arranged in parallel to lead to a particular sorting destination. The high-throughput conveyance 403 can be positioned directly above the sorting destinations 409 to facilitate immediately depositing sorted metal scrap to the appropriate sorting destinations 409, and/or the high-throughput conveyance 403 can be connected with a series of paths, conveyors, or chutes for directing the sorted articles to the sorting destinations 409*a*, 409*b*, 409*c*, respectively. The system 400 can include a final sorting destination 411 for receiving mixed metal scrap that does not meet any of the supported sorting criteria, or that otherwise escapes detection by the system 400, and that proceeds to a final outlet path 407 of the high-throughput conveyance 403.

The functions of the analyzer 413, marking device 415, sensors 417, and actuators 439 can be automated under the control of a controller 421 that includes at least one processor 423 and operates by executable instructions stored in a non-transitory, non-volatile memory device 425. According to various embodiments, the controller 421 can be a single computer system that is connected to the electromechanical components of the system 400, directly or indirectly, e.g. via a network 427 such as a wireless network. According to various other embodiments, the controller 421 can be made up of any suitable number of local and remote computing systems that cooperate to control the analyzer 413, marking device 415, sensors 417, and actuators 437, all of which may be connected to each other directly or indirectly via network 427.

The analyzer 413 can include any suitable metal analyzer capable of detecting a metal type or determining the composition of an article of metal scrap or otherwise identifying a sorting attribute of the metal scrap. According to some embodiments, a sorting attribute of the metal scrap can be the specific metal alloy or the series of metal article. For example, according to some specific embodiments, the analyzer 413 can be a metal analyzer for determining the class of aluminum alloy of the metal scrap, e.g. the specific alloy or the alloy series, e.g., 4xxx series aluminum alloy, 2xxx series aluminum alloy, 3xxx series aluminum alloy, 4xxx series aluminum alloy, 5xxx series aluminum alloy, 6xxx series aluminum alloy, 7xxx series aluminum alloy, or 8xxx series aluminum alloy. Suitable analyzers can include, but are not limited to, a laser-induced breakdown spectroscope (LIBS) metal analyzer, an X-ray fluorescence (XRF) metal analyzer, an X-ray trace (XRT) metal analyzer, or a prompt gamma neutron activation analyzer (PGNAA). According to some embodiments, the analyzer 413 can determine the sorting attribute of an article of metal scrap in times on the order of milliseconds, and at ranges of up to about 300 mm from the article. Increasing the throughput of the sorting system 400 can be achieved by including multiple analyzers 413 along the conveyor 401 that can analyze different articles as they pass along the conveyor 401. According to at least one embodiment, the analyzer 413 can include at least two LIBS or other metal analyzers in parallel, although any number of analyzers 413 can be included.

After each metal article is analyzed by the analyzer 413, the conveyor 401 can convey the article to the marking device 415, which places a visually identifiable and/or machine-readable marking on the article according to the sorting attribute of the article that has been identified by the analyzer 413. According to various embodiments, the marking device 415 can include a paint sprayer configured to direct aerosolized paint to a point or region on the article of metal scrap, a pellet gun configured to direct a capsule of paint to a point or region of the article of metal scrap, a laser configured to etch a pattern or marking on the article of metal scrap, a robotic device configured to stamp the article with an ink or paint pattern, with a physical tag, with an RFID tag, or with any other suitable machine-readable or visually identifiable marking, or any other suitable marking device to mark the article of metal scrap with a machine-readable or visually identifiable marking.

According to some embodiments, the marking device 415 can be configured to impart a pattern of paint on the article including two or more colors. Depending on the number of sorting attributes for which the system 400 is designed, the marking device 415 can color code articles with a different color to denote each sorting attribute, or can color code articles with a pattern of two or more different colors to denote the sorting attributes. According to some embodiments, the marking device 415 can code the articles with colors in the visible spectrum that can be identified by either human operators or by optical sensors. Alternatively, or in combination, the marking device 415 can code the articles with ultraviolet paint or with fluorescent paint that can be detected by suitable optical sensors. The use of color coding outside of the visible spectrum or with fluorescence can be used to avoid interference by any existing paint or discoloration on the articles of metal scrap.

According to at least one embodiment, the analyzer 413 and the marking device 415 can be included in the same device, e.g., some metal analyzers being capable of both analyzing and laser etching the articles of metal scrap. For example, a LIBS analyzer can perform both the analysis and marking function by determining the sorting attribute of an article of metal scrap and then subsequently etching a pattern of marks on the metal article using a laser.

The sensors 417 can include any suitable automated sensor that can quickly read the type of marking placed on the articles of metal scrap by the marking device 415. According to various embodiments, where the marking device 415 paints a color or a pattern on the articles of metal scrap, the sensors 417 include a series of cameras that obtain images of the articles of metal scrap as they pass along the high-throughput conveyance 403. The amount of paint required for positive identification can be very small, e.g., having a diameter in the range of 3 mm to 30 mm. The captured images are quickly processed by the controller 421 to determine, at each location along the high-throughput conveyance 403, whether an article includes a marking that identifies the article as having the sorting attribute for a particular sorting destination 409. Cameras can be used as the sensors 417 when the marking device 415 etches a pattern of marks on each article of metal scrap, or for any case where the marking is visually identifiable. In some alternative embodiments, where the marking is a machine-readable code or an RFID tag, the sensors 417 can include a code reader or an RFID sensor.

The actuators 439 can include any suitable electromechanically actuated mechanism, including pneumatic mechanisms, that can rapidly displace the articles of metal scrap as they pass along the high-throughput conveyance 403. For example, according to some embodiments, the actuators 439 are pneumatic actuators configured to push the articles of metal scrap off to one side of the high-throughput conveyance 403, to drop articles from the high-throughput conveyance 403, or to divert the articles from the high-throughput conveyance 403 to any one of a series of alternate paths or chutes 405 that may diverge from the high-throughput conveyance 403. The actuators 439 are preferably configured to displace the articles of metal scrap rapidly and to return to a starting position quickly enough that displacing any one article does not interfere with passage of any subsequent articles along the high-throughput conveyance 403. According to some embodiments, the time to cycle the actuators 439 can be on the order of 10 ms to 1000 ms, or from 100 ms to 1000 ms.

Figure 5:
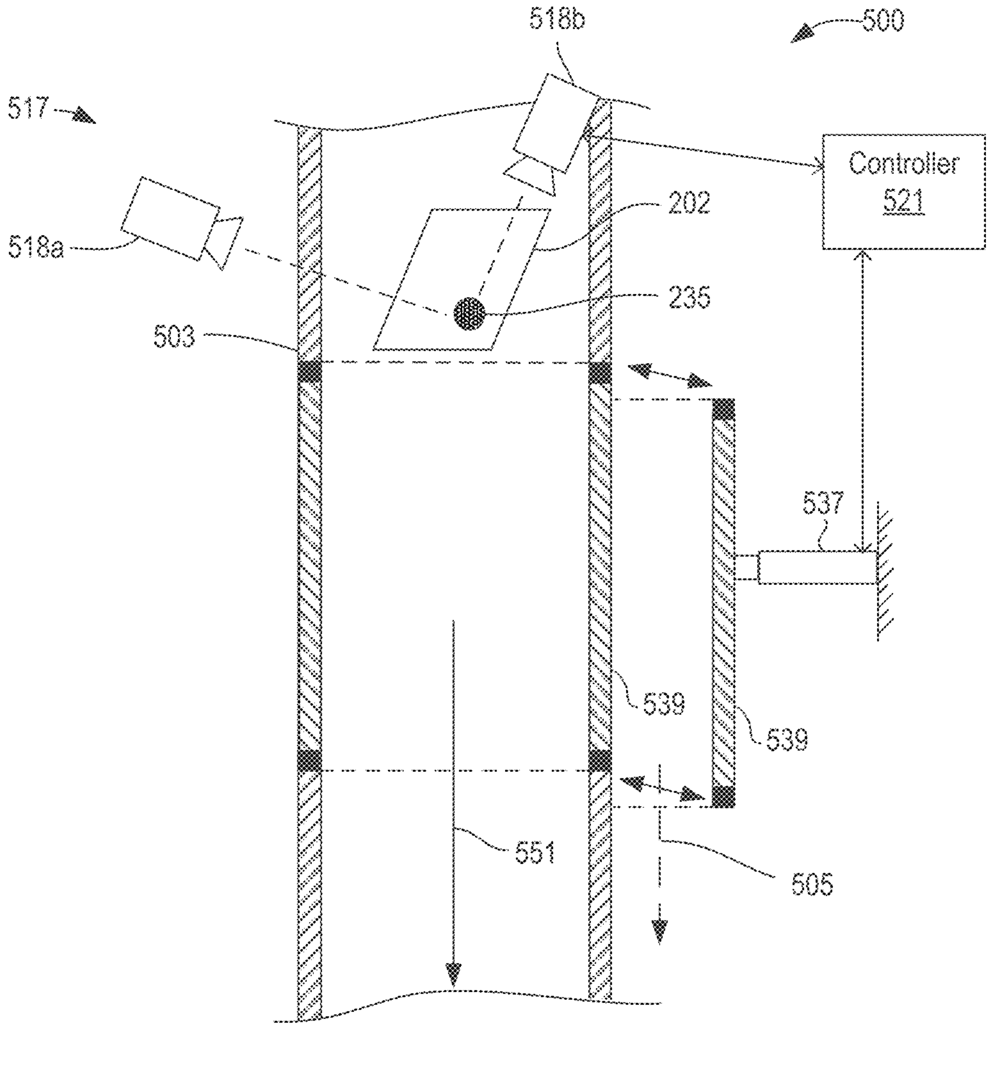
FIG. 5 is a top-view schematic illustrating a second example of aspects of a metal sorting process compatible with the system of FIG. 4.

FIG. 5 is a top-view schematic illustrating aspects compatible with the system of FIG. 4, including a mixed metal sorting system 500. The mixed metal sorting system 500 includes a high-throughput conveyance 503, such as but not limited to, a sloped chute, rapid conveyor, set of rollers, or other suitable high-throughput conveyance. As a marked article of metal scrap 202 passes along the high-throughput conveyance 503, the marked article of metal scrap 202 will pass by a series of sensing stations 517, which can include any suitable number of sensors 518 (such as sensors 518*a*, 518*b*, etc.). The sensors 518 can include any suitable sensor for detecting the type of marking 235 that has been placed on the marked article 202. According to some embodiments, the sensors 518 are cameras, which can be positioned to view multiple angles of the marked article 202 to reduce the likelihood that the system 500 will miss the marking 235. In conjunction with controller 221, the sensors 518 can detect the marking 235 and determine whether the marked article 202 qualifies for sorting to an outlet path 505 to a particular sorting destination, or whether the marked article 202 does not qualify, in which case the marked article can continue along a main path 541 of the high-throughput conveyance 503. According to various embodiments, not all articles that pass the analyzer assembly 213 (FIG. 2) need to be marked. For example, small pieces (below a threshold size), organics, or metals other than those targeted for sorting can be omitted from marking and allowed to pass to the end of the sorting system 500. In some embodiments, the outlet path 505 can simply be ejection from beneath the high-throughput conveyance 503. Alternatively, the outlet path 505 can include a different chute or rapid conveyor that catches the dropped article and passes it to a sorting destination.

If the mixed metal sorting system 500 determines that the marked article 202 does qualify for sorting based on the marking 235, the controller 221 instructs an actuator 537 to retract a panel 439 along the outlet path 505. Any suitable electromechanical or pneumatic actuator may be used. According to at least one embodiment, the actuator 537 is pneumatic, but alternative actuators can be electromechanical, hydraulic, or use any other suitable actuation method.

Figure 6:
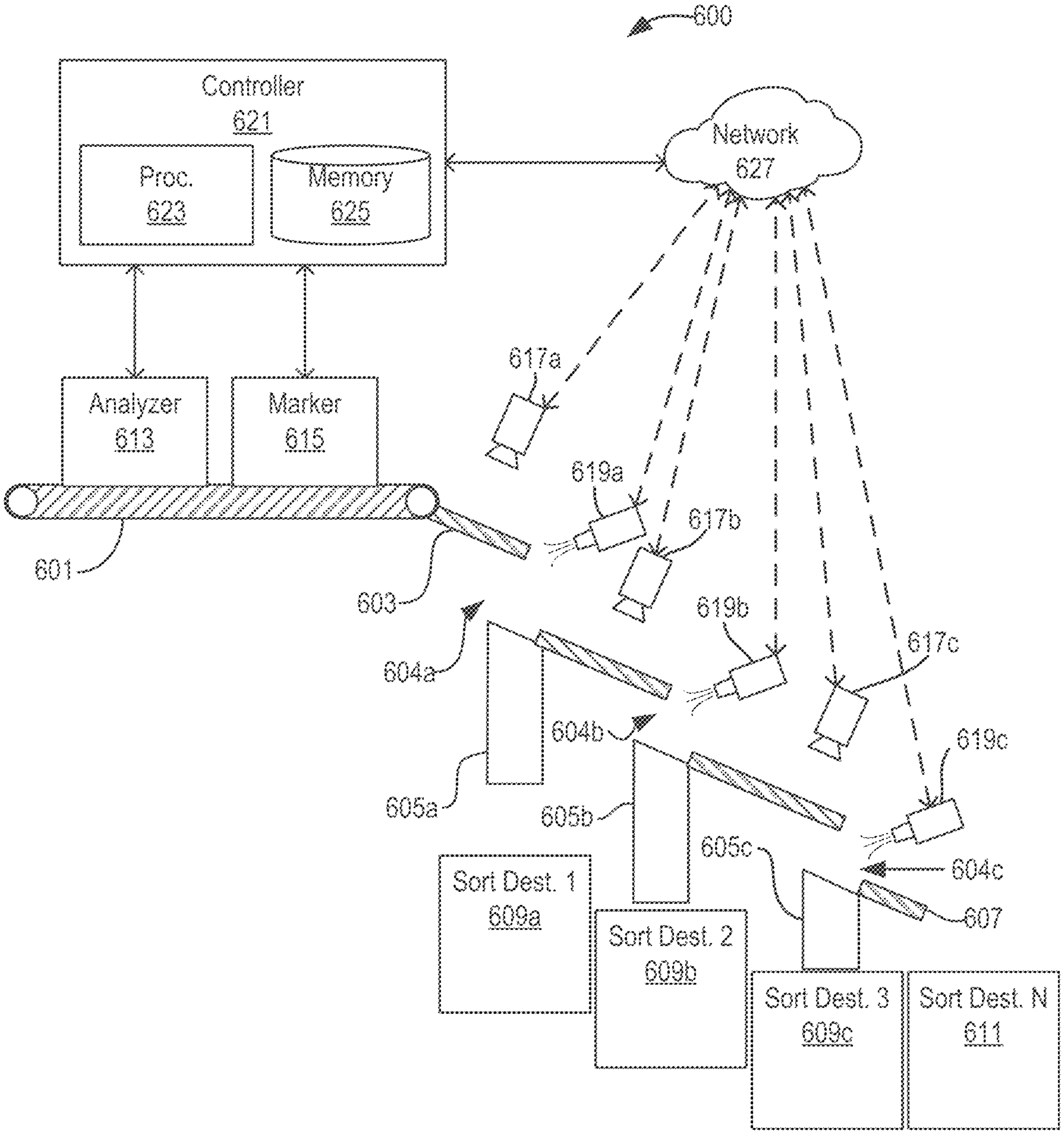
FIG. 6 is a high-level side-view schematic illustrating a third system for sorting recyclable metal scraps, in accordance with various embodiments.

Variations in the structure of the high-throughput conveyance (103, FIG. 1, 303, FIG. 3, 403, FIG. 4, or 503, FIG. 5) may be used to further increase the throughput and efficiency of sorting systems. For example, FIG. 6 is a high-level side-view schematic illustrating a similar system 600 for sorting recyclable metal scraps in which a high-throughput conveyance 603 includes multiple segments separated by gaps 604, in accordance with various embodiments.

The system 600 includes a conveyor 601 for carrying articles of mixed metal scrap for analysis by a metal analyzer 613 and subsequent marking by a marking device 615, similar to the analyzing and marking aspects described with reference to system 100 of FIG. 1 or system 200 of FIG. 2. The conveyor 601 subsequently deposits the articles of the marked mixed metal scrap on a high-throughput conveyance 603 from which the articles of metal scrap are sorted.

The sorting process conducted from the high-throughput conveyance 603 also includes passing the articles of mixed metal scrap in a continuous process past a series of sensors 617 (such as sensors 617*a*, 617*b*, 617*c*, although any suitable number of sensors in series may be used), each sensor being associated with an actuator 6439 (such as actuators 6439*a*, 6439*b*, 6439*c*, although more or fewer actuators may be used). In contrast with the high-throughput conveyance 103 of FIG. 1, high-throughput conveyance 603 is broken by a series of gaps 604 (such as gaps 604*a*, 604*b*, 604*c*) that are sized to allow passage of articles of metal scrap through the gaps, but positioned with respect to each other so that an article passing unimpeded down the high-throughput conveyance 603 continues all the way to a final outlet path 607 leading to a final sorting destination 611.

The sensors 617 can include any suitable automated sensor that can quickly read the type of marking placed on the articles of metal scrap by the marking device 615. According to various embodiments, where the marking device 615 paints a color or a pattern on the articles of metal scrap, the sensors 617 include a series of cameras that obtain images of the articles as they pass along the high-throughput conveyance 603. The captured images are quickly processed by the controller 621 to determine, at each location along the high-throughput conveyance, whether an article includes a marking that identifies the article as having the sorting attribute for a particular sorting destination. Cameras can be used as the sensors 617 for the cases where the marking device 615 etches a pattern of marks on each article, or for any case where the marking is visually identifiable. In some alternative embodiments, where the marking is a machine-readable code or an RFID tag, the sensors 617 can include a code reader or an RFID sensor.

The actuators 6439*a*, 6439*b*, 6439*c* may be a series of pressurized nozzles positioned along the high-throughput conveyance 603 to slow or to displace articles of mixed metal scrap to cause the articles to fall through one of the gaps 604 for sorting to one of any suitable number of sorting destinations 609*a*, 609*b*, 609*c*, etc., where each sorting destination is designated for receiving metal scrap having a particular sorting attribute. The high-throughput conveyance 603 can be positioned directly above the sorting destinations 609 to facilitate immediately depositing sorted metal scrap to the appropriate sorting destinations, or can be connected with a series of paths, conveyors, or chutes 605*a*, 605*b*, 605*c* for directing the sorted articles to the sorting destinations 609*a*, 609*b*, 609*c*, respectively. The system 600 can include a final sorting destination 611 for receiving mixed metal scrap that does not meet any of the supported sorting criteria, or that otherwise escapes detection by the sorting system, and proceeds to a final outlet path 607 of the high-throughput conveyance 603.

Figure 7:
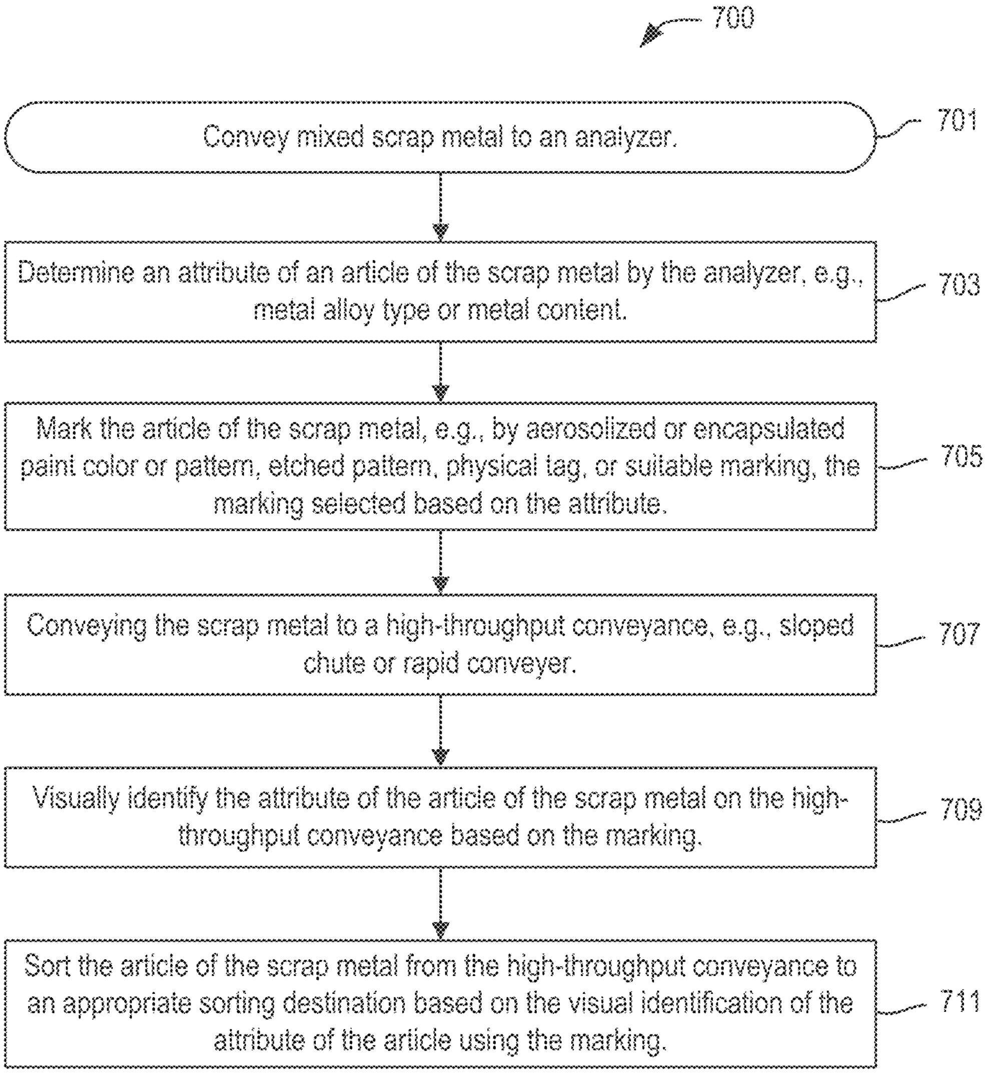
FIG. 7 is a process flow diagram illustrating a first example process for sorting metal scraps, in accordance with various embodiments.
Figure 8:
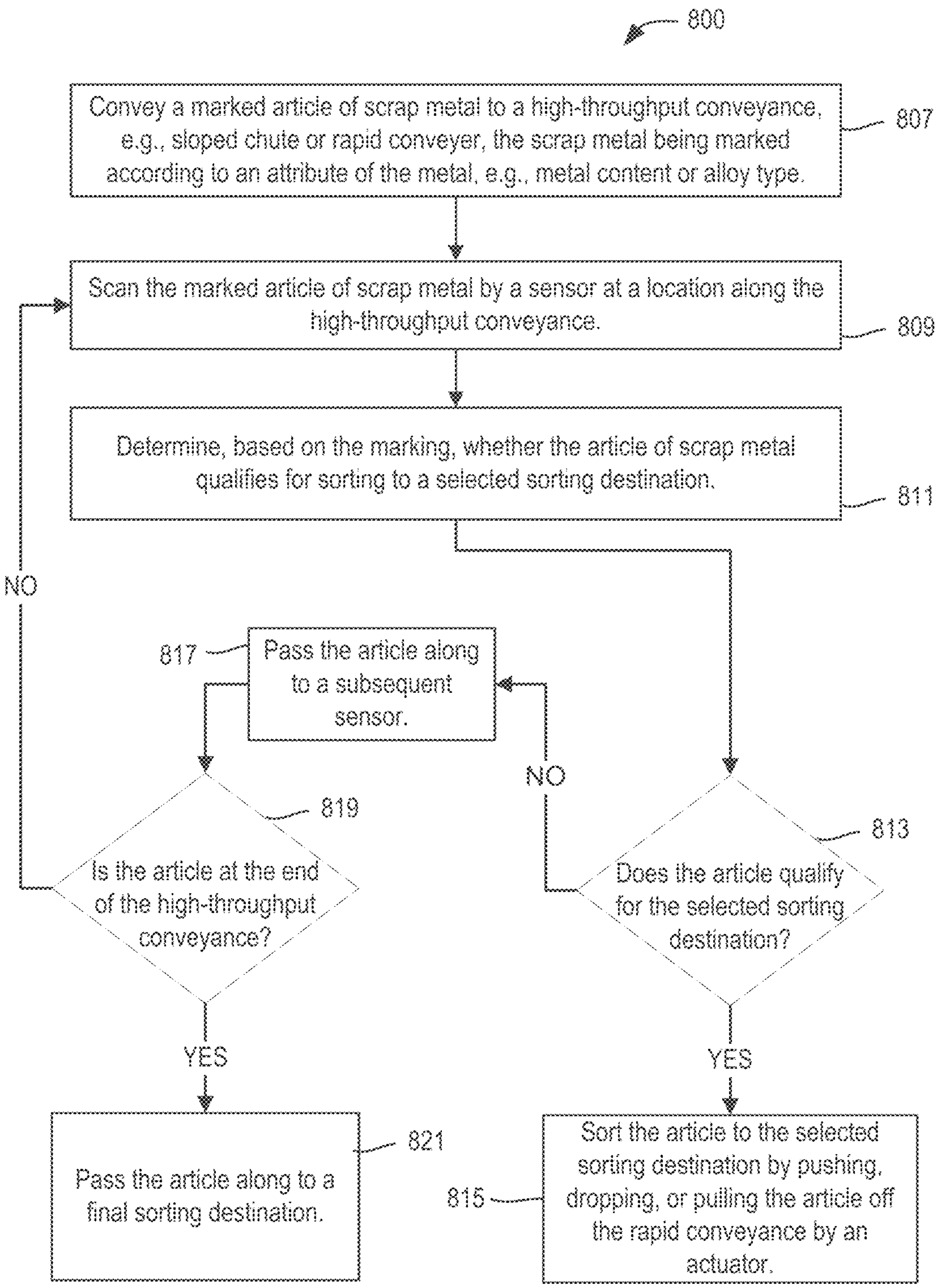
FIG. 8 is a process flow diagram illustrating a second example process for sorting metal scraps, in accordance with various embodiments.
Figure 9:
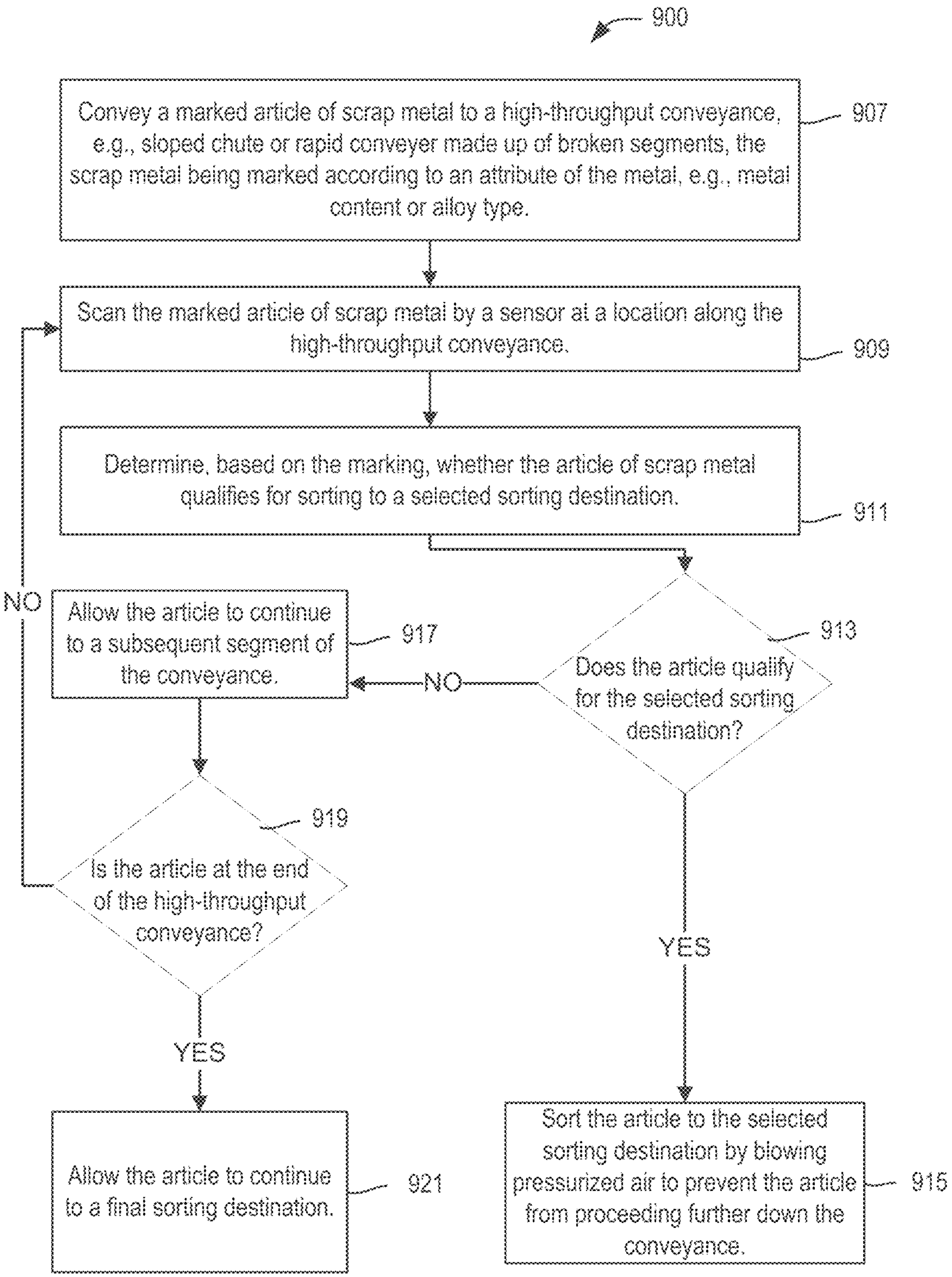
FIG. 9 is a process flow diagram illustrating a third example process for sorting metal scraps, in accordance with various embodiments.

FIGS. 7-9 illustrate various examples of processes for sorting metal scraps to improve overall efficiency of a metal separating or recycling process. Some or all of the processes 700, 800, or 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Except where explicitly contraindicated, process steps of any process described herein may be performed in conjunction with or substituted with process steps of any other process described herein.

FIG. 7 is a process flow diagram illustrating a first example process 700 for sorting metal scraps, in accordance with various embodiments. First, at 701, metal scrap containing a mixture of articles of different types or alloys can be conveyed to an analyzer. Conveying the mixed metal scrap can be achieved by a variety of possible conveyors, including but not limited to a conveyor belt, robotic actuators, rollers, by the force of gravity acting with respect to a smooth sloped surface, manual loading, or other suitable conveyance. Generally, the mixed metal scrap can be conveyed in a continuous process, whereby the conveyor continually moves additional articles of next metal scrap to the analyzer.

Under computerized control, the analyzer can determine at 703 an attribute of the article of metal scrap, such as the type of metal, the type of alloy, alloy series, or other relevant sorting attribute.

Next, at 705, the conveyor moves the article of metal scrap that has been analyzed to a marking device that imparts a mark on the article of metal scrap that is visually identifiable and/or machine-readable and conveys information specific to the relevant attribute identified by the analyzer. A parameter of the specific mark placed on the article of metal scrap is determined based on the sorting attribute, so that the parameter is linked to identifying the sorting attribute. Suitable parameters of the mark can include, but are not limited to: for painted marks, the color or color pattern of the mark(s); for etched marks, the length and pattern of markings; for tags, the code or appearance of any machine-readable indicia present on the tag; or for RFID tags, any suitable numerical or coded information stored in the tag; or comparable variations in other suitable marks that can be used to identify a category or a sorting attribute of the article of metal scrap.

According to some embodiments, in a continuous process, at 707, the flow of mixed metal scrap is deposited from the conveyor to a secondary, high-throughput conveyance such as, but not limited to, a sloped chute, rapid conveyor, sloped assembly of rollers, or other suitable high-throughput conveyance. Articles in the flow of mixed scrap on the high-throughput conveyance can be rapidly sorted without the system having to maintain records of the attributes or identities of any particular article. To do so, the system can visually or otherwise identify at 709 whether the article of metal scrap matches a sorting criterion associated with each station along the high-throughput conveyance, i.e., whether the attributes of the article of metal scrap on the high-throughput conveyance match with a sorting destination, based on the marking, e.g., by a camera system, scanner, code reader, RFID reader, or other suitable noncontact or optical sensor.

When the sensor identifies that the article of metal scrap is suitable for sorting to a particular sorting destination based on the visual or other identification of the attribute of the article of metal scrap, the system at 711 can cause the article of metal scrap to be sorted to that sorting destination by removing the article from the high-throughput conveyance.

FIG. 8 is a process flow diagram illustrating a second example process 800 for sorting metal scraps, in accordance with various embodiments. The process 800 includes detailed identification and sorting steps that can be used in conjunction with the analyzing and marking steps described above with reference to process 700 (FIG. 7).

Under computerized control, the system can at 807 convey a marked article of metal scrap to a high-throughput conveyance, such as but not limited to a sloped chute, rapid conveyor, sloped roller assembly, robotic conveyance, or any other suitable continuous conveyor. The marked article of metal scrap is marked according to an attribute of the metal scrap, for example, the type of metal, the alloy composition, the alloy series, or any other suitable attribute, particularly attributes relevant for sorting for recycling. Specific forms of marking can include, but are not limited to: a region of deposited paint; a pattern of deposited paint; a pattern of laser etched marks; a fluorescent tag or florescent paint; a physical tag, such as an adhered machine-readable code; an RFID tag; or any other suitable tag that can be visually identified or identified by scanning the tag.

The marked article of metal scrap is then scanned at 809 by the sensor at a location along a high-throughput conveyance. The sensor can be, for example, a camera system including one or more than one camera positioned to capture an image of the marked article, and preferably from an angle at which the mark on the article is most likely to be visible, e.g. above the high-throughput conveyance. Similar positioning can be used if the sensor is a scanner, such as an infrared scanner for detecting a machine-readable code, a fluorescence detector, an RFID sensor, or any other suitable sensor matched to the type of marking used on the marked article. By scanning the article, the system can identify the marking and determine at 811 whether the article of metal scrap qualifies for sorting to a selected sorting destination by determining whether the attribute linked to the marking is a designated attribute for the selected sorting destination.

Each sensor or group of sensors can be staged along the length of the high-throughput conveyance, with each sensor or group of sensors making up the station from which articles of metal scrap can be removed from the high-throughput conveyance for diversion to a specific sorting destination. When the system determines, based on the marking, that the article qualifies for the selected sorting destination, at 813, the system can sort the article at 815 to the selected sorting destination by pushing the article off of the high-throughput conveyance, or by diverting the article for receipt by another conveyor, a bin, or other suitable transportation means or storage container for receiving sorted articles of metal scrap. In some cases, the article of metal scrap can be directed immediately for further processing, e.g. to a furnace, or can be directed for packaging or compression to facilitate shipment of sorted recyclables to a suitable facility.

If the article of metal scrap does not qualify for the selected sorting destination, at 817, the system can pass the article along to a subsequent stage of the high-throughput conveyance at which it can be conveyed past a subsequent sensor. If, however, the article of metal scrap has reached the end of the high-throughput conveyance, at 819, the article can be passed at 821 to a final sorting destination, e.g., a container for waste, non-recyclable scrap, or non-identifiable scrap. At each subsequent stage of the high-throughput conveyance, the article of metal scrap can be rapidly scanned by additional sensors at 809 to determine whether the article of metal scrap qualifies for sorting according to a series of different attributes. According to one example, a continuous sorting system can have a series of sensors and actuators positioned along the high-throughput conveyance, where each sensor determines whether the marking on the article of metal scrap corresponds to a particular metal alloy. According to one specific example, a first sensor and actuator assembly along the high-throughput conveyance can be configured to detect markings corresponding to an X aluminum alloy (e.g., any one of 1xxx series aluminum alloys, 2xxx series aluminum alloys, 3xxx series aluminum alloys, etc.) and if the marking on an article of metal scrap matches the marking for the designated X aluminum alloy, that first actuator is instructed to push the article of metal scrap from the high-throughput conveyance to direct the article to a first sorting destination that will contain only the designated X aluminum alloy. Otherwise, the first actuator does not actuate, and the article of metal scrap continues along the high-throughput conveyance past a subsequent second sensor and actuator assembly. The subsequent second sensor and actuator assembly along the high-throughput conveyance can be configured to detect markings corresponding to a Y aluminum alloy (e.g., a different series of aluminum alloy than X aluminum alloy), and if the marking on the article of metal scrap matches the marking for the designated Y aluminum alloy, the second actuator is instructed to push the article of metal scrap from the high-throughput conveyance to direct the article to a second sorting destination that will contain only the designated Y aluminum alloy.

Similar sorting processes can be conducted with variations in the sorting mechanisms to achieve increased sorting speeds. For example, FIG. 9 is a process flow diagram illustrating a third example process 900 for sorting metal scraps, in accordance with various embodiments. The process 900 includes detailed identification and sorting steps that can be used in conjunction with the analyzing and marking steps described above with reference to process 700 (FIG. 7), and utilizing a high-throughput conveyance that includes segmented conveyances that make use of gravity and pressurized air to rapidly redirect sorted metal scrap.

Under computerized control, the system can convey at 907 a marked article of metal scrap to a high-throughput conveyance, such as but not limited to a sloped chute, rapid conveyor, sloped roller assembly, robotic conveyance, or any other suitable continuous conveyor. The marked article of metal scrap is marked according to an attribute of the metal scrap, for example, the type of metal, the alloy, or any other suitable attribute, particularly attributes relevant for sorting for recycling. Specific forms of marking can include: a region of deposited paint; a pattern of deposited paint; a pattern of laser etched marks; a fluorescent tag or florescent paint; a physical tag, such as an adhered machine-readable code; an RFID tag; or any other suitable tag that can be visually identified or identified by scanning the tag.

The marked article of metal scrap is then scanned at 909 by the sensor at a location along a high-throughput conveyance that is made up of multiple segments defining gaps between the segments that the article of metal scrap can pass over, or can fall through, depending on whether the momentum of the article of metal scrap is reduced by an outside force. The sensor can be, for example, a camera system including one or more than one camera positioned to capture an image of the marked article, and preferably from an angle at which the mark on the article is most likely to be visible, e.g. above the high-throughput conveyance. Similar positioning can be used if the sensor is a scanner, such as an infrared scanner for detecting a machine-readable code, a fluorescence detector, an RFID sensor, or any other suitable sensor matched to the type of marking used on the marked article. By scanning the article, the system can identify at 911 the marking and determine whether the article of metal scrap qualifies for sorting to a selected sorting destination by determining whether the attribute linked to the marking is a designated attribute for the selected sorting destination.

If the system determines at 913 that the article qualifies for sorting to a particular sorting destination that can be accessed from the gap in the high-throughput conveyance immediately downstream of the sensor, the system can sort the article at 915 to the selected sorting destination by interrupting the passage of the article of metal scrap along the high-throughput conveyance, e.g., by actuating a nozzle to blow pressurized air to prevent the article from proceeding further down the conveyance and causing the article to fall through the gap. Each sorting destination, as described above, can include any suitable means of conveying the articles for further processing, storage, or transportation with like sorted articles of metal scrap.

If the system determines that the article does not qualify for the selected sorting destination, e.g. by determining that the marking on the article of metal scrap does not match the marking for the particular sorting destination, or by failure to detect a marking, the system at 917 will not arrest the momentum of the article and will allow it to continue toward a subsequent segment of the high-throughput conveyance. If the article has now reached an end of the high-throughput conveyance (719), the article can be allowed at 921 to continue to a final sorting destination with other articles of metal scrap that do not meet any of the sorting criteria. Otherwise, the article of metal scrap proceeds to new segments of the high-throughput conveyance, where it is again scanned at 909 by a subsequent sensor at another location along the high-throughput conveyance, from which the system determines based on the marking at 911 whether the article of metal scrap qualifies for sorting to another selected sorting destination.

Definitions and Descriptions

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," or "the" includes singular and plural references unless the context clearly dictates otherwise.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Illustrations

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1 is a system for sorting metal scrap, comprising: a first conveyor configured to convey metal scrap; a metal analyzer positioned with respect to the first conveyor to analyze the metal scrap conveyed by the first conveyor; a marking device positioned with respect to the first conveyor to mark the metal scrap conveyed by the first conveyor; a first sensor configured to scan the metal scrap; a first actuator configured to direct the metal scrap to a first sorting destination; and a controller configured to: determine by the metal analyzer an attribute of a first article of metal scrap conveyed by the first conveyor; cause the marking device to mark the first article of metal scrap with a first machine-readable mark, the first machine-readable mark based on the attribute of the first article of metal scrap; detect the first machine-readable mark by the first sensor; determine whether the first article of metal scrap meets a first sorting criterion based on the first machine-readable mark detected by the first sensor; and cause the first actuator to direct the first article of metal scrap to the first sorting destination in response to determining that the first article of metal scrap meets the first sorting criterion.

Illustration 2 the system of any preceding or subsequent illustration, further comprising: a high-throughput conveyance configured to receive the metal scrap conveyed by the conveyor, the high-throughput conveyance comprising a chute or a second conveyor that conveys the metal scrap at a higher rate than the first conveyor, wherein the first sensor and the first actuator are positioned to scan the metal scrap on the high-throughput conveyance, and to direct the metal scrap to the first sorting destination from the high-throughput conveyance, respectively.

Illustration 3 is the system of any preceding or subsequent illustration, further comprising: a second sensor configured to visually scan the metal scrap; and a second actuator configured to direct the metal scrap to a second sorting destination, wherein the controller is further configured to: prevent the first actuator from directing the first article of metal scrap to the first sorting destination in response to determining that the first article of metal scrap does not meet the first sorting criterion; detect the first machine-readable mark by the second sensor; determine whether the first article of metal scrap meets a second sorting criterion based on the first machine-readable mark detected by the second sensor; and cause the second actuator to direct the first article of metal scrap to the second sorting destination in response to determining that the first article of metal scrap meets the second sorting criterion.

Illustration 4 is the system of any preceding or subsequent illustration, further comprising a chute configured to receive the metal scrap conveyed by the conveyor, wherein the first sensor, second sensor, first actuator, and second actuator are positioned to scan the metal scrap and to direct the metal scrap as the metal scrap passes along the chute, the second sensor and second actuator being positioned along the chute after the first sensor and first actuator.

Illustration 5 is the system of any preceding or subsequent illustration, wherein the first actuator comprises a mechanical actuator configured to push/pull the metal scrap toward the first sorting destination or configured to drop the metal scrap toward the first sorting destination.

Illustration 6 is the system of any preceding or subsequent illustration, wherein the first actuator comprises a blower configured to push the metal scrap toward the first sorting destination using pressurized air.

Illustration 7 is the system of any preceding or subsequent illustration, further comprising a high-throughput conveyance configured to receive the metal scrap conveyed by the conveyor, the high-throughput conveyance comprising a chute or a second conveyor that conveys the metal scrap at a higher rate than the first conveyor, wherein: the high-throughput conveyance comprises a gap positioned proximate the first sensor and the first actuator; and the first actuator comprises a blower configured to selectively push the first article of metal scrap through the gap in the high-throughput conveyance when the controller causes the first actuator to direct the first article of metal scrap to the first sorting destination.

Illustration 8 is the system of any preceding or subsequent illustration, wherein: the marking device comprises a color gun configured to selectively mark the metal scrap with one or more colors; the first sensor is configured to detect the one or more colors marked on the metal scrap; and the executable instructions, when executed by the at least one processor, further configure the controller to: cause the marking device to selectively mark the first article of metal scrap with the one or more colors based on the attribute of the first article of metal scrap; and determine whether the first article of metal scrap meets the first sorting criterion by detecting, by the first sensor, the one or more colors marked on the first article of metal scrap.

Illustration 9 is the system of any preceding or subsequent illustration, wherein the marking device comprises one of: a sprayer configured to direct aerosolized paint, a laser configured to etch a pattern, or a pellet gun configured to direct a capsule of paint.

Illustration 10 is the system of any preceding or subsequent illustration, wherein the metal analyzer comprises one of: a laser-induced breakdown spectroscope (LIBS) metal analyzer, an X-ray fluorescence (XRF) metal analyzer, and X-ray trace (XRT) metal analyzer, or a prompt gamma neutron activation analyzer (PGNAA).

Illustration 11 is a method of sorting mixed metal scrap, comprising: determining, by a metal analyzer, an attribute of a first article of metal scrap of a plurality of articles of mixed metal scrap; and marking the first article of metal scrap with a first machine-readable mark, wherein a parameter of the first machine-readable mark is selected based on the attribute.

Illustration 12 is the method of any preceding or subsequent illustration, further comprising: determining, by a second metal analyzer, an attribute of a second article of scrap metal of the plurality of articles of mixed scrap metal in parallel with determining the attribute of the first article of metal scrap.

Illustration 13 is the method of any preceding or subsequent illustration, further comprising: detecting the first machine-readable mark on the first article of metal scrap by scanning the first article by a first sensor; and sorting the first article of the plurality of articles to a first sorting destination based on the first machine-readable mark.

Illustration 14 is the method of any preceding or subsequent illustration, further comprising: passing the plurality of articles of mixed metal scrap along a first conveyor; and subsequently passing the plurality of articles of mixed metal scrap from the first conveyor to a high-throughput conveyance, the high-throughput conveyance comprising one of a chute or a second conveyor, wherein the attribute of the first article of metal scrap is determined by the metal analyzer and the first article of metal scrap is marked while on the first conveyor, and wherein the machine-readable mark is detected on the first article of metal scrap and the first article of metal scrap is sorted while on the high-throughput conveyance.

Illustration 15 is the method of any preceding or subsequent illustration, further comprising: determining, by the metal analyzer, a second attribute of a second article of metal scrap of the plurality of articles of mixed metal scrap, the second attribute being different from the first attribute; marking the second article of metal scrap with a second machine-readable mark, wherein a respective parameter of the second machine-readable mark is selected based on the second attribute, and wherein the second machine-readable mark is visually distinguishable from the first machine-readable mark; detecting the second machine-readable mark of the second article by visually scanning the second article by a second sensor that is different from the first sensor; and sorting the second article to a second sorting destination that is different than the first sorting destination based on the detected second machine-readable mark.

Illustration 16 is the method of any preceding or subsequent illustration, wherein the first article and the second article are sorted simultaneously.

Illustration 17 is the method of any preceding or subsequent illustration, further comprising: detecting the second machine-readable mark on the second article by scanning the second article by the first sensor; and preventing the second article from being sorted to the first sorting destination based on the detected second machine-readable mark.

Illustration 18 is the method of any preceding or subsequent illustration, wherein the attribute of the first article comprises a metal or metal alloy composition of the first article.

Illustration 19 is the method of any preceding or subsequent illustration, wherein the attribute of the first article of mixed metal scrap comprises an aluminum alloy series of the first article.

Illustration 20 is the methods of any preceding or subsequent illustration, wherein the machine-readable mark comprises a sprayed region of color paint, and the parameter of the machine-readable mark is a paint color or color pattern.

Illustration 21 is a system, comprising: a first conveyor; an analyzer positioned with respect to the first conveyor to analyze metal scrap conveyed by the first conveyor; a marking device positioned with respect to the first conveyor to mark the metal scrap conveyed by the first conveyor; and a controller configured to: determine, via the analyzer, a first composition or alloy series of a first article of metal scrap conveyed by the first conveyor; cause the marking device to mark the first article of metal scrap with a first machine-readable mark, wherein a parameter of the first machine-readable mark is based on the first composition or alloy series of the first article of metal scrap; determine, via the analyzer, a second composition or alloy series of a second article of metal scrap conveyed by the first conveyor, the second composition or alloy series being different from the first composition or alloy series; and cause the marking device to mark the second article of metal scrap with a second machine-readable mark that is different from the first machine-readable mark.

Illustration 22 is the system of any preceding or subsequent illustration, further comprising: a first sensor and a second sensor configured to visually scan the metal scrap; and a first actuator and a second actuator configured to sort the metal scrap to one of a first sorting destination or a second sorting destination, respectively, wherein controller is further configured to: detect the first machine-readable mark by the first sensor; sort the first article of metal scrap to a first sorting destination, by the first actuator, based on the first machine-readable mark; detect the second machine-readable mark by the second sensor; and sort the second article of metal scrap to a second sorting destination, different from the first sorting destination, by the second actuator, based on the detected second machine-readable mark.

Illustration 23 is the system of any preceding or subsequent illustration, wherein: causing the marking device to mark the first article of metal scrap comprises depositing paint on the first article of metal scrap; the first machine-readable mark comprises a first paint color or pattern; and the second machine-readable mark comprises a second paint color or pattern, the second paint color or pattern being visually distinguishable from the first paint color or pattern.

Illustration 24 is a method of sorting mixed metal scrap, comprising: detecting a first machine-readable mark on a first article of metal scrap by scanning the first article by a first sensor, wherein the first machine-readable mark corresponds to a sorting attribute of the first article of scrap metal; and sorting the first article of the plurality of articles to a first sorting destination based on the detection of the first machine-readable mark.

Illustration 25 is a system, comprising a first conveyor; a first sensor and a second sensor configured to visually scan articles of metal scrap on the first conveyor; and a first actuator and a second actuator configured to sort the articles of metal scrap to one of a first sorting destination or a second sorting destination, respectively, wherein controller is further configured to: detect a first machine-readable mark by the first sensor on a first article of metal scrap; sort the first article of metal scrap to a first sorting destination, by the first actuator, based on the first machine-readable mark; detect a second machine-readable mark by the second sensor on a second article of metal scrap; and sort the second article of metal scrap to a second sorting destination, different from the first sorting destination, by the second actuator, based on the detected second machine-readable mark.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. In the figures and the description, like numerals are intended to represent like elements. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12".

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A system for sorting metal scrap, comprising:

a first conveyor configured to convey metal scrap;

a metal analyzer positioned with respect to the first conveyor to analyze the metal scrap conveyed by the first conveyor;

a marking device positioned with respect to the first conveyor to mark the metal scrap conveyed by the first conveyor;

a first sensor configured to scan the metal scrap;

a first actuator configured to direct the metal scrap to a first sorting destination; and a controller configured to:

determine by the metal analyzer an attribute of a first article of metal scrap conveyed by the first conveyor;

cause the marking device to mark the first article of metal scrap with a first machine-readable mark, the first machine-readable mark based on the attribute of the first article of metal scrap;

detect the first machine-readable mark by the first sensor;

determine whether the first article of metal scrap meets a first sorting criterion based on the first machine-readable mark detected by the first sensor; and cause the first actuator to direct the first article of metal scrap to the first sorting destination in response to determining that the first article of metal scrap meets the first sorting criterion.

2. The system of claim 1, further comprising:

a high-throughput conveyance configured to receive the metal scrap conveyed by the conveyor, the high-throughput conveyance comprising a chute or a second conveyor that conveys the metal scrap at a higher rate than the first conveyor, wherein the first sensor and the first actuator are positioned to scan the metal scrap on the high-throughput conveyance, and to direct the metal scrap to the first sorting destination from the high-throughput conveyance, respectively.

3. The system of claim 1, further comprising:

a second sensor configured to scan the metal scrap; and a second actuator configured to direct the metal scrap to a second sorting destination, wherein the controller is further configured to:

prevent the first actuator from directing the first article of metal scrap to the first sorting destination in response to determining that the first article of metal scrap does not meet the first sorting criterion;

detect the first machine-readable mark by the second sensor;

determine whether the first article of metal scrap meets a second sorting criterion based on the first machine-readable mark detected by the second sensor;

and cause the second actuator to direct the first article of metal scrap to the second sorting destination in response to determining that the first article of metal scrap meets the second sorting criterion.

4. The system of claim 3, further comprising a chute configured to receive the metal scrap conveyed by the conveyor, wherein the first sensor, the second sensor, the first actuator, and the second actuator are positioned to scan the metal scrap and to direct the metal scrap as the metal scrap passes along the chute, wherein the second sensor and the second actuator are positioned along the chute after the first sensor and first actuator.

5. The system of claim 1, wherein the first actuator comprises a mechanical actuator configured to push the metal scrap toward the first sorting destination or configured to drop the metal scrap toward the first sorting destination.

6. The system of claim 1, wherein the first actuator comprises a blower configured to push the metal scrap toward the first sorting destination using pressurized air.

7. The system of claim 1, further comprising a high-throughput conveyance configured to receive the metal scrap conveyed by the conveyor, the high-throughput conveyance comprising a chute or a second conveyor that conveys the metal scrap at a higher rate than the first conveyor, wherein:

the high-throughput conveyance comprises a gap positioned proximate the first sensor and the first actuator; and the first actuator comprises a blower configured to selectively push the first article of metal scrap through the gap in the high-throughput conveyance when the controller causes the first actuator to direct the first article of metal scrap to the first sorting destination.

8. The system of claim 1, wherein:

the marking device comprises a color gun configured to selectively mark the metal scrap with one or more colors;

the first sensor is configured to detect the one or more colors marked on the metal scrap; and the controller is further configured to:

cause the marking device to selectively mark the first article of metal scrap with the one or more colors based on the attribute of the first article of metal scrap;

and determine whether the first article of metal scrap meets the first sorting criterion by detecting, by the first sensor, the one or more colors marked on the first article of metal scrap.

9. The system of claim 1, wherein the marking device comprises one of: a sprayer configured to direct aerosolized paint, a laser configured to etch a pattern, or a pellet gun configured to direct a capsule of paint.

10. The system of claim 1, wherein the metal analyzer comprises one of: a laser-induced breakdown spectroscope (LIBS) metal analyzer, an X-ray fluorescence (XRF) metal analyzer, and X-ray trace (XRT) metal analyzer, or a prompt gamma neutron activation analyzer (PGNAA).

11. A method of sorting mixed metal scrap, comprising:

determining, by a metal analyzer, an attribute of a first article of metal scrap of a plurality of articles of mixed metal scrap; and marking the first article of metal scrap with a first machine-readable mark, wherein a parameter of the first machine-readable mark is selected based on the attribute.

12. The method of claim 11, further comprising:

determining, by a second metal analyzer, an attribute of a second article of scrap metal of the plurality of articles of mixed scrap metal in parallel with determining the attribute of the first article of metal scrap.

13. The method of claim 11, further comprising:

detecting the first machine-readable mark on the first article of metal scrap by scanning the first article by a first sensor; and sorting the first article of the plurality of articles to a first sorting destination based on the first machine-readable mark.

14. The method of claim 13, further comprising:

passing the plurality of articles of mixed metal scrap along a first conveyor; and subsequently passing the plurality of articles of mixed metal scrap from the first conveyor to a high-throughput conveyance, the high-throughput conveyance comprising one of a chute or a second conveyor, wherein the attribute of the first article of metal scrap is determined by the metal analyzer and the first article of metal scrap is marked while on the first conveyor, and wherein the machine-readable mark is detected on the first article of metal scrap and the first article of metal scrap is sorted while on the high-throughput conveyance.

15. The method of claim 13, further comprising:

determining, by the metal analyzer, a second attribute of a second article of metal scrap of the plurality of articles of mixed metal scrap, the second attribute being different from the first attribute;

marking the second article of metal scrap with a second machine-readable mark, wherein a respective parameter of the second machine-readable mark is selected based on the second attribute, and wherein the second machine-readable mark is visually distinguishable from the first machine-readable mark;

detecting the second machine-readable mark of the second article by visually scanning the second article by a second sensor that is different from the first sensor; and sorting the second article to a second sorting destination that is different than the first sorting destination based on the detected second machine-readable mark.

16. The method of claim 15, wherein the first article and the second article are sorted simultaneously.

17. The method of claim 13, further comprising:

detecting a second machine-readable mark on a second article by scanning the second article by the first sensor; and preventing the second article from being sorted to the first sorting destination based on the detected second machine-readable mark.

18. The method of claim 13, wherein the attribute of the first article comprises at least one of a metal or metal alloy composition of the first article or an aluminum alloy series of the first article.

19. The method of claim 13, wherein the machine-readable mark comprises a sprayed region of color paint, and the parameter of the machine-readable mark is a paint color or color pattern.

20. A system, comprising:

a first conveyor;

an analyzer positioned with respect to the first conveyor to analyze metal scrap conveyed by the first conveyor;

a marking device positioned with respect to the first conveyor to mark the metal scrap conveyed by the first conveyor; and a controller configured to:

determine, via the analyzer, a first composition or alloy series of a first article of metal scrap conveyed by the first conveyor;

cause the marking device to mark the first article of metal scrap with a first machine-readable mark, wherein a parameter of the first machine-readable mark is based on the first composition or alloy series of the first article of metal scrap;

determine, via the analyzer, a second composition or alloy series of a second article of metal scrap conveyed by the first conveyor, the second composition or alloy series being different from the first composition or alloy series; and cause the marking device to mark the second article of metal scrap with a second machine-readable mark that is different from the first machine-readable mark.

* * * * *